United States Patent
Brehmer et al.

(10) Patent No.: US 12,397,383 B2
(45) Date of Patent: Aug. 26, 2025

(54) METHOD FOR PRODUCING AND PROCESSING A CYLINDRICAL HOLLOW BODY MADE OF ALUMINUM OR AN ALUMINUM ALLOY AND FOR ARRANGING IT IN A MOTOR VEHICLE TRANSMISSION, CYLINDRICAL HOLLOW BODY AND VEHICLE TRANSMISSION

(71) Applicant: ZF Friedrichshafen AG, Friedrichshafen (DE)

(72) Inventors: Martin Brehmer, Tettnang (DE); Christian Ruhl, Friedrichshafen (DE); Helmut Boehm, St. Ingbert (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/529,264

(22) Filed: Dec. 5, 2023

(65) Prior Publication Data
US 2024/0198463 A1    Jun. 20, 2024

(30) Foreign Application Priority Data
Dec. 14, 2022    (DE) ..................... 10 2022 213 597.0

(51) Int. Cl.
     *B23P 15/14*      (2006.01)
(52) U.S. Cl.
     CPC .................................. *B23P 15/14* (2013.01)

(58) Field of Classification Search
     CPC ...... B23P 15/14; B23P 2700/50; B22D 17/00; B22D 25/02; F16H 27/02; F16H 57/023; F16H 2057/02043
     See application file for complete search history.

(56) References Cited

U.S. PATENT DOCUMENTS

| 8,978,733 | B2 | 3/2015 | Hahn et al. | |
| 11,772,212 | B2 | 10/2023 | Ruhl et al. | |
| 2022/0241908 | A1* | 8/2022 | Ruhl | B23P 15/00 |
| 2023/0100588 | A1* | 3/2023 | Ruhl | B23P 15/14 |
| | | | | 72/368 |

FOREIGN PATENT DOCUMENTS

| DE | 102011056942 B3 | 5/2013 | |
| DE | 102019207311 A1 | 11/2020 | |
| WO | WO-2020234306 A1 * | 11/2020 | B22D 17/00 |

* cited by examiner

*Primary Examiner* — Christopher J. Besler
(74) *Attorney, Agent, or Firm* — Dority & Manning, P.A.

(57) ABSTRACT

A method for producing and processing a cylindrical hollow body (20) made of aluminum or an aluminum alloy and for arranging cylindrical hollow body (20) in a motor vehicle transmission includes producing the hollow body (20) by a casting process (1) in such a way that the hollow body (20) has an inner and an outer lateral surface (21, 22) and has internal toothing (24) on the inner lateral surface (21), and centrally clamping the hollow body (20) for processing. The hollow body (20) is arranged in the vehicle transmission exclusively via tooth flanks of the internal toothing (24) (6). The hollow body (20) is clamped centrally (2) exclusively on a partial region (23) of the inner lateral surface (21), away from the internal toothing (24).

8 Claims, 1 Drawing Sheet

METHOD FOR PRODUCING AND PROCESSING A CYLINDRICAL HOLLOW BODY MADE OF ALUMINUM OR AN ALUMINUM ALLOY AND FOR ARRANGING IT IN A MOTOR VEHICLE TRANSMISSION, CYLINDRICAL HOLLOW BODY AND VEHICLE TRANSMISSION

CROSS-REFERENCE TO RELATED APPLICATION

The present application is related and has right of priority to German Patent Application No. DE102022213597.0 filed on Dec. 14, 2022, which is incorporated by reference in its entirety for all purposes.

TECHNICAL FIELD

The present invention relates generally to a method for producing and processing a cylindrical hollow body made of aluminum or an aluminum alloy and for arranging it in a motor vehicle transmission, to a corresponding cylindrical hollow body, and to a corresponding vehicle transmission.

BACKGROUND

In the motor vehicle manufacturing sector, the increasing use of components made of lightweight materials for reasons of reducing the weight of vehicles and, consequently, of saving fuel and of reducing carbon dioxide ($CO_2$) emissions is familiar. Since such lightweight components generally replace conventional components, for example components made of steel, they must meet the same requirements in respect of mechanical load-bearing capacity, corrosion resistance, and ideally also in respect of machinability and production costs. In this context, it is, in particular, different aluminum alloys, whose properties can be selectively adjusted within a certain range by the different alloy constituents, which have proven to be well suited. The components produced from the different aluminum alloys are usually produced as castings, with high demands being placed on the geometric characteristics of the components and, in particular, on geometric precision. Finish-machining of the components cast from aluminum or an aluminum alloy is therefore generally required.

In this connection, DE 10 2011 056 942 B3 discloses a method for producing a thin-walled and cylindrical component made of aluminum or of an aluminum alloy. Here, the component is first produced by diecasting. The component is then clamped centrally in the unfinished state, and its inner surface as well as its outer surface are turned. Only the partial region in which the component is clamped is exempted from turning. Finally, the component is rotated in order to determine any imbalance that may be present. In order to reduce or eliminate the imbalance, the component is then provided with compensating holes. The partial region that remains unprocessed during turning serves both as a bearing surface for clamping the component during turning or balancing and as a bearing surface for installing the component in an assembly.

DE 10 2019 207 311 A1 describes a method similar to DE 10 2011 056 942 B3 for producing and processing a cylindrical hollow body made of aluminum or an aluminum alloy. However, the method of DE 10 2019 207 311 A1 differs from the method of DE 10 2011 056 942 B3 in that, for processing, the hollow body is centrally clamped on a tip circle diameter of the internal toothing, while the hollow body is installed in a transmission via the tooth flanks of the internal toothing.

However, the known production methods are disadvantageous in that, when the hollow body is clamped on a region of the internal toothing during processing, a partial region of the lateral surface is selected, which does not provide a continuous contact surface for the clamping tool. This causes comparatively high pressures in the region of the contact surface. In addition, the interrupted contact surface promotes deviation of the longitudinal axis of the hollow body from an axis of rotation during processing.

BRIEF SUMMARY

Example aspects of the invention provide an improved method for producing and processing a cylindrical hollow body made of aluminum or an aluminum alloy and for arranging the cylindrical hollow body in a motor vehicle transmission.

Example aspects of invention provide a method for producing and processing a cylindrical hollow body made of aluminum or an aluminum alloy and for arranging the cylindrical hollow body in a motor vehicle transmission, wherein the hollow body is produced by a casting process in such a way that the hollow body has an inner and an outer lateral surface and has internal toothing on the inner lateral surface, wherein the hollow body is centrally clamped for processing, and wherein the hollow body is arranged in the vehicle transmission exclusively via tooth flanks of the internal toothing.

The method according to example aspects of the invention is distinguished by the fact that the hollow body is clamped centrally exclusively on a partial region of the inner lateral surface, away from the internal toothing.

Thus, according to example aspects of the invention, it is envisaged that first a cylindrical hollow body is cast by a casting process known per se in the prior art, either from aluminum or from an aluminum alloy. According to example aspects of the invention, it is not necessary to fix on a specific casting process as long as the casting process is suitable in principle for casting hollow bodies made of aluminum or of an aluminum alloy. Since this is a cylindrical hollow body, it has a round cross section and an inner and an outer lateral surface. In addition, annular circumferential internal toothing is provided on the inner lateral surface. The cylindrical hollow body is preferably of tubular design, that is to say therefore preferably has two open axial ends, via which for example, processing of the inner lateral surface is easily possible. Both the inner and the outer lateral surface can advantageously have surface contours, for example in the form of circumferential grooves, attached circumferential collars, notches, beads, holes or the like. In order to simplify processing of the hollow body following production, provision is made to clamp the hollow body centrally. For this purpose, the prior art contains clamping devices which enable a cylindrical hollow body made of aluminum or of an aluminum alloy to be clamped centrally. According to example aspects of the invention, the central clamping is carried out exclusively on a partial region of the inner lateral surface, away from the internal toothing.

Example aspects of the invention thus provide an alternative by which, on the one hand, it is possible to avoid the functional clamping in the flanks of the drive toothing, which is fundamentally very complex since the clamping elements have to penetrate into free spaces between individual teeth. On the other hand, clamping on the tooth tips can also be avoided, something that often leads to inaccuracies in the alignment of the hollow body during clamping since in this case clamping can only be carried out on the individual tooth tip segments and not on an uninterrupted surface.

Instead, according to example aspects of the invention, clamping therefore takes place on an advantageously circumferential surface away from the toothed region. This results in a clear separation of the functional region, namely the toothing, from the clamping region. Damage to the toothing due to the high forces during clamping and unwanted expansion of the toothing region can also be reliably prevented in this way. In addition, it is possible to clamp onto the continuous inner lateral surface, which allows a comparatively more precise alignment of the hollow body.

By clamping the hollow body for processing centrally exclusively on a partial region of the inner lateral surface, away from the internal toothing, and by arranging the hollow body in the vehicle transmission exclusively via the internal toothing, different surfaces are used for processing and for the arrangement of the hollow body. This leads to the already mentioned advantage that the respectively most suitable regions of the hollow body can be used both for clamping in the course of processing and for the arrangement of the hollow body.

Since the entire inner lateral surface, including the internal toothing, is produced by the same casting mold part and in the same production step during the casting process, the lateral surface and the internal toothing are aligned as precisely as possible with respect to one another, and therefore the axes of rotation for the hollow body when clamping during processing and when arranging said hollow body in the vehicle transmission do not differ. This ensures the exact relationship to the internal toothing and, in particular, to the tooth flanks of the internal toothing, which represent the functional surfaces on the finished part.

According to a preferred example embodiment of the invention, it is envisaged that the partial region rests against the internal toothing. This therefore means that the partial region on which clamping is carried out is arranged directly adjacent to the internal toothing. As a preferred example option, the internal toothing is arranged on an outermost axial edge of the hollow body, and, viewed from outside the hollow body, the partial region is arranged directly behind the internal toothing.

As an alternative example preference, however, the partial region can also be spaced apart from the internal toothing, for example by a few millimeters or centimeters. Arrangement of the partial region at the axial end opposite the internal toothing is also conceivable and preferred.

According to a further preferred example embodiment of the invention, it is envisaged that the partial region is thickened relative to a wall thickness of the hollow body. This means therefore that the wall thickness of the partial region is greater than the wall thickness of the remainder of the hollow body, with the possible exception of the region of the internal toothing. The wall thickness in the region of the internal toothing can likewise be thickened as compared with the wall thickness of the remainder of the hollow body. It is thus possible to introduce even high forces into the hollow body via the partial region and, where applicable, via the internal toothing.

If the partial region rests against the internal toothing, the wall thickness in this common region can have a common thickness.

According to a further preferred example embodiment of the invention, it is envisaged that the casting process is carried out as a diecasting process. In this case, the aluminum or the aluminum alloy is preferably first introduced in liquid form into a corresponding filling chamber of a casting device, the filling chamber being filled under pressure by applying pressure to the aluminum or the aluminum alloy by a casting piston. The pressurization is advantageously maintained until the aluminum or the aluminum alloy has solidified. It is thereby possible to produce comparatively precise geometric shapes with only a low reject rate.

According to a further preferred example embodiment of the invention, it is envisaged that the inner and/or the outer lateral surface are/is turned as part of the processing of the hollow body, wherein, however, the partial region remains unturned. As a preferred option, the partial region is not only left unturned but also completely unmachined. This results in the advantage that the geometry of the cast hollow body is finish-machined as far as necessary, thus enabling extremely precise shaping to be achieved. Here, the geometric precision that can be achieved by machining is generally higher than the geometric precision that can be achieved by a casting process. Since the hollow body is provided for use in a vehicle transmission and there, in particular, for transmitting torques or rotational speeds, good concentricity properties and thus high geometric precision are important prerequisites.

In this case, the partial region is not turned, if only because the hollow body is clamped here, and the partial region is therefore not accessible to a turning tool, at least not without a re-clamping process. Although subsequent re-clamping on another region of the surface of the hollow body and thus turning of the partial region would be possible, it would give rise to additional effort and thus additional costs and should accordingly be avoided. Moreover, re-clamping on another region of the surface of the hollow body and associated turning of the partial region could lead to the hollow body as such having a different axis of rotation than the partial region, which in turn would adversely affect the concentricity properties in the vehicle transmission.

According to a further preferred example embodiment of the invention, provision is made for the hollow body to be balanced as part of processing. The balancing in the sense according to example aspects of the invention here equally includes the determination of imbalances and elimination of the imbalances. The elimination of the imbalances does not necessarily have to be complete, but must be performed at least to an extent such that a predetermined maximum permissible imbalance is no longer exceeded. By the balancing, very good smooth running properties of the hollow body can thus be achieved, which in turn contributes to lower noise emissions and a longer service life of the vehicle transmission in which the hollow body is arranged. In this context, balancing is preferably carried out by machining, with material being removed selectively at those points of the hollow body which lead to the respectively determined imbalance. The material removal is in turn preferably accomplished by drilling openings of larger or smaller dimensions through the lateral surfaces of the hollow body, wherein a diameter of the respectively provided drilled opening can be dependent on a severity of the determined imbalance. These drilled openings accordingly serve as balancing holes.

The imbalances are preferably determined by a device known per se for determining the imbalances which is suitable for this purpose. Since the balancing takes place as part of processing, the hollow body is clamped to the tip circle diameter of the internal toothing.

According to a further preferred example embodiment of the invention, it is envisaged that the hollow body is produced in a manner adapted to the vehicle transmission in such a way that a tip circle diameter of the internal toothing remains contact-free after the hollow body has been arranged in the vehicle transmission. This means therefore that the tooth tip surfaces of the internal toothing are not in contact with or do not rest against contact points or contact surfaces of any element of the vehicle transmission. On the contrary, torque is transmitted using only the flanks of the internal toothing, which are suitable for this purpose.

It is preferably envisaged that the hollow body is produced in such a way that the hollow body has more than just one set of internal toothing. This results in the advantage that the hollow body can advantageously be used for transmitting torques in the vehicle transmission. Here, a first internal toothing serves as an input for the torque to be transmitted, while a second internal toothing serves as an output for the torque to be transmitted.

According to a further preferred example embodiment of the invention, provision is made for the hollow body to be deburred and/or brushed and/or washed as part of the processing of the hollow body. In this context, the hollow body can be brushed and/or washed both before balancing and after balancing. Deburring, in contrast, preferably takes place exclusively after balancing since deburring is thus advantageously possible to remove all burrs, including those which have arisen due to any balancing holes provided. This makes it possible to ensure that any material particles or burrs which may be present do not enter the vehicle transmission and adversely affect the efficiency of the vehicle transmission.

Example aspects of the invention further relate to a cylindrical hollow body made of aluminum or an aluminum alloy. The hollow body according to example aspects of the invention is distinguished by the fact that the hollow body is produced by the method according to example aspects of the invention. As a result, the advantages already mentioned in connection with the method according to example aspects of the invention are also obtained for the hollow body according to example aspects of the invention.

Finally, example aspects of the invention also relates to a vehicle transmission. The vehicle transmission according to example aspects of the invention is distinguished by the fact that the vehicle transmission includes at least one cylindrical hollow body according to example aspects of the invention. This leads to the advantages already described.

BRIEF DESCRIPTION OF THE DRAWINGS

Aspects of the invention are explained by way of example below with reference to exemplary embodiments illustrated in the figures.

More specifically.

Figure 1:
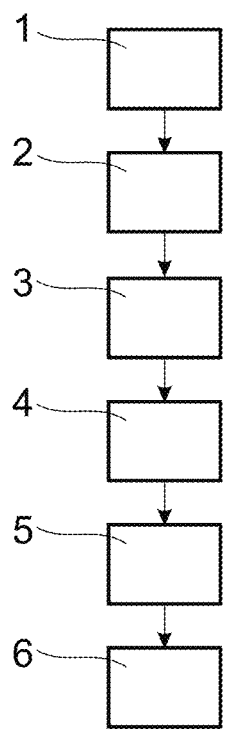
FIG. 1 shows, by way of example, one possible embodiment of a method according to example aspects of the invention for producing and processing a cylindrical hollow body made of aluminum or an aluminum alloy and for arranging it in a motor vehicle transmission.

Identical objects, functional units and comparable components are denoted by the same reference signs throughout the figures. These objects, functional units and comparable components are of identical design in respect of their technical features, unless explicitly or implicitly implied otherwise by the description.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows, by way of example, one possible embodiment of a method according to example aspects of the invention for producing and processing a cylindrical hollow body 20 made of aluminum or an aluminum alloy and for arranging the cylindrical hollow body 20 in a motor vehicle transmission in the form of a flow diagram.

In method step 1, the hollow body 20 is first produced by a casting process, in the example by a diecasting process. Production is carried out in such a way, in accordance with a casting tool used or in accordance with a filling chamber of the casting tool, that the hollow body 20 has an inner and an outer lateral surface 21, 22, wherein, in the example, a first inner toothing 24 and a second inner toothing 24' as well as a partial region 23 for clamping the hollow body 20 are provided on the inner lateral surface. In addition, the production of the hollow body 20 in step 1 is adapted to the vehicle transmission in such a way that a tip circle diameter 25 of the internal teeth 24 and 24' remains contact-free after the hollow body 20 has been arranged in the vehicle transmission.

For processing of the hollow body 20, the hollow body 20 is then clamped centrally in step 2. In this case, the central clamping takes place exclusively on the unturned or unmachined partial region 23, which, in the example, is arranged away from, but directly adjacent to, the first internal toothing 24.

In method step 3, both the inner lateral surface 21 and the outer lateral surface 22 are turned as part of the processing of the hollow body 20, while only the partial region 23 and the sets of internal toothing 24, 24' remain unprocessed. In the example, the turning of the inner and outer lateral surfaces 21, 22 is performed by a turning device designed for this purpose.

In the following method step 4, the hollow body 20 is re-clamped on the partial region 23, and balanced. As part of the balancing process, the imbalances of the hollow body 20 are first of all determined, this being accomplished by a device for determining imbalances, which is designed for this purpose. If an impermissible imbalance is detected, excess material on the hollow body 20, which causes the eccentricity, is removed as part of the balancing process. In the example, the removal of the excess material is accomplished by making balancing holes 34 through the inner and outer lateral surfaces 21, 22.

In a subsequent method step 5, the hollow body 20 is deburred, brushed and washed in order to remove any burrs and contaminants that may be present.

Finally, in method step 6, the hollow body 20 is arranged in the vehicle transmission, wherein arrangement takes place exclusively via tooth flanks of the sets of internal toothing 24 and 24'.

Figure 2:
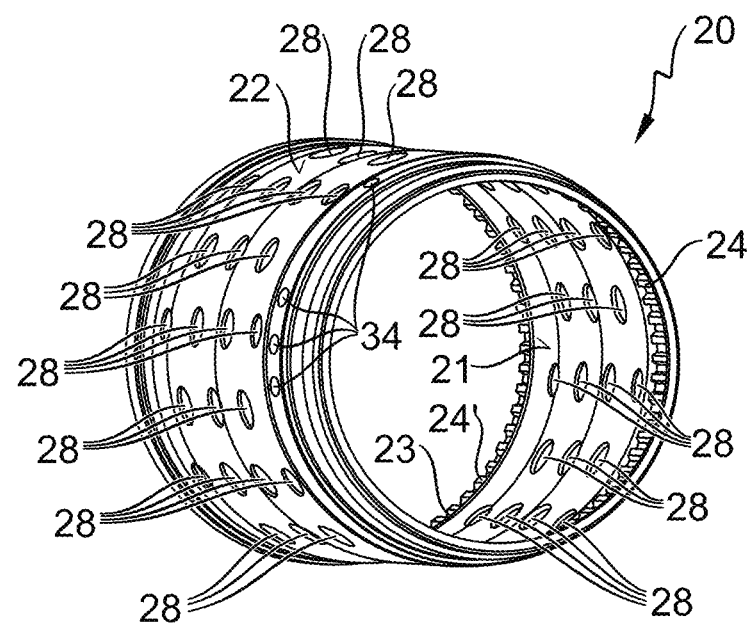
FIG. 2 shows, by way of example, one possible embodiment of a cylindrical FIG. 2 hollow body according to example aspects of the invention.

FIG. 2 shows, by way of example, one possible embodiment of a cylindrical hollow body 20 according to example aspects of the invention. The hollow body 20 illustrated is formed of an aluminum alloy, in the example of AlSi9Cu3 (Fe), and was produced by a diecasting process. The cylindrical hollow body 20 has an inner lateral surface 21 and an outer lateral surface 22, both of which have been turned as part of a processing operation on the hollow body 20. Only a partial region 23, the first internal toothing 24, and the second internal toothing 24' have remained unturned or unmachined, that is to say are still in the unfinished state. The sets of internal toothing 24, 24' were produced together with the entire hollow body 20 during the casting process.

It can furthermore be seen that the hollow body 20 has a multiplicity of holes 28. In this case, the holes 28 have different diameters and serve, on the one hand, to reduce the weight of the hollow body 20 and also to drain oil out of the hollow body 20 when the hollow body 20 is used in the vehicle transmission.

In addition, balancing holes 34 can be seen, these being arranged predominantly as close as possible to the partial region 23 or at the sets of internal toothing 24, 24'. The balancing holes 34 can have different diameters, depending on the material removal required, and serve to improve the properties, in particular the acoustic concentricity properties of the hollow body 20 in the vehicle transmission. In addition, however, the balancing holes 34 also contribute to further weight reduction of the hollow body 20 and to further improved oil drainage out of the hollow body 20.

Figure 3:
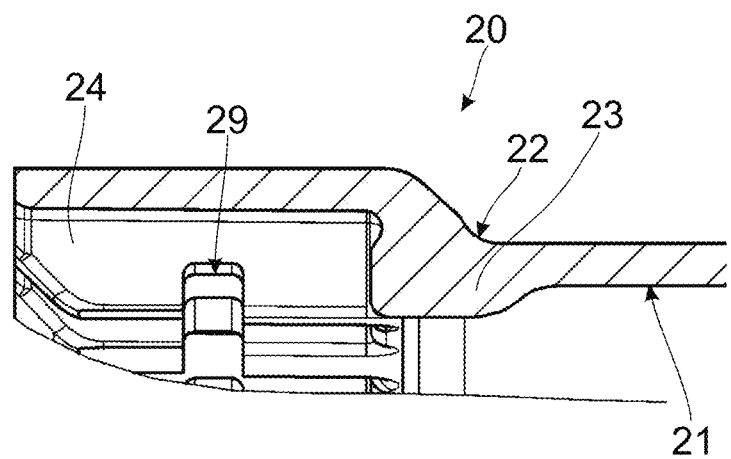
FIG. 3 shows, by way of example and schematically, a detail of a cross section of a hollow body according to example aspects of the invention.

FIG. 3 shows, by way of example and schematically, a detail of a cross section of a hollow body 20 according to example aspects of the invention. The detail illustrates a part of the outer lateral surface 22 and a part of the inner lateral surface 21 with the internal toothing 24 and the partial region 23. As can be seen, the internal toothing 24 and the partial region 23 are directly adjacent to each other, i.e. the internal toothing 24 merges into the partial region 23. Both the internal toothing 24 and the partial region 23 are thickened as compared with the wall thickness of the remainder of the hollow body 20, with the result that the internal toothing 24 and the partial region 23 are of more mechanically stable design and are also suitable as a point of application for comparatively high forces or torques. In this case, the internal toothing 24 is arranged at one axial end of the hollow body 20 and has a groove 29, into which a snap ring can be inserted, for example, in order to secure the arrangement of the hollow body 20 in the vehicle transmission on a corresponding toothed disk of the vehicle transmission.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS 1 production of the hollow body
2 central clamping
3 turning of the inner and outer lateral surface
4 balancing
5 deburring, brushing and washing
6 arrangement in the vehicle transmission
20 hollow body
21 inner lateral surface
22 outer lateral surface
23 partial region with internal toothing
24, 24° internal toothing, first internal toothing, second internal toothing
25 tip circle diameter
28 hole
29 groove
34 balancing hole

The invention claimed is:

1. A method for producing and processing cylindrical hollow bodies (20) for arrangement in motor vehicle transmissions, the method comprising:
producing a hollow body (20) by a casting process (1) such that the hollow body (20) comprises an inner lateral surface (21), an outer lateral surface (22), and internal toothing (24) on the inner lateral surface (21), the hollow body (20) being cylindrical and made of aluminum or aluminum alloy;
centrally clamping (2) the hollow body (20) exclusively on a partial region (23) of the inner lateral surface (21) and away from the internal toothing (24) to allow for processing; and
arranging the hollow body (20) in a vehicle transmission (6) exclusively via tooth flanks of the internal toothing (24).

2. The method of claim 1, wherein the partial region (23) abuts the internal toothing (24).

3. The method of claim 1, wherein a thickness of the partial region (23) is greater than a thickness of a wall of the hollow body (20).

4. The method of claim 1, wherein the casting process is a diecasting process.

5. The method of claim 1, further comprising processing the hollow body (20) after centrally clamping (2) the hollow body (2), one or both of the inner lateral surface (21) and the outer lateral surface (22) being machined by turning (3) during the processing and the partial region (23) being unmachined during the processing.

6. The method of claim 1, further comprising balancing the hollow body (20).

7. The method of claim 1, wherein a tip circle diameter (25) of the internal toothing (24) remains contact-free after the hollow body (20) is arranged in the vehicle transmission (6).

8. The method of claim 1, further comprising one or both of:
deburring the hollow body (20);
brushing the hollow body (20); and
washing (5) the hollow body (20).

* * * * *